United States Patent
Vacanti et al.

(10) Patent No.: US 8,791,856 B2
(45) Date of Patent: Jul. 29, 2014

(54) SYSTEMS AND METHODS FOR AUTOMATICALLY DETERMINING A NOISE THRESHOLD

(75) Inventors: David C. Vacanti, Renton, WA (US); Radde Majeed, Orlando, FL (US); Anthony H. Luk, Everett, WA (US)

(73) Assignee: Honeywell International Inc., Morristown, NJ (US)

( * ) Notice: Subject to any disclaimer, the term of this patent is extended or adjusted under 35 U.S.C. 154(b) by 581 days.

(21) Appl. No.: 13/080,833

(22) Filed: Apr. 6, 2011

(65) Prior Publication Data

US 2012/0256781 A1 Oct. 11, 2012

(51) Int. Cl.
*G01S 13/00* (2006.01)

(52) U.S. Cl.
USPC ............................................. 342/196; 342/192

(58) Field of Classification Search
USPC .................................................. 342/192, 196
See application file for complete search history.

(56) References Cited

U.S. PATENT DOCUMENTS

| | | | |
|---|---|---|---|
| 5,280,288 A | 1/1994 | Sherry et al. | |
| 6,229,474 B1 * | 5/2001 | Uehara | 342/70 |
| 7,239,266 B2 | 7/2007 | Vacanti | |
| 7,340,375 B1 | 3/2008 | Patenaud et al. | |
| 7,567,204 B2 | 7/2009 | Sakamoto | |
| 7,825,851 B2 | 11/2010 | Vacanti | |
| 2004/0104702 A1 * | 6/2004 | Nakadai et al. | 318/568.12 |
| 2008/0180312 A1 | 7/2008 | Nakanishi | |
| 2009/0021419 A1 * | 1/2009 | Winstead | 342/92 |
| 2009/0058713 A1 * | 3/2009 | Okunishi et al. | 342/91 |
| 2009/0085797 A1 | 4/2009 | Wise et al. | |
| 2011/0063164 A1 * | 3/2011 | Mizutani et al. | 342/26 R |

FOREIGN PATENT DOCUMENTS

JP  2001324566  11/2001

OTHER PUBLICATIONS

European Patent Office, "European Search Report", mailed Jul. 27, 2012, Published in: EP.
European Patent Office, "Office Action", Aug. 23, 2012, pp. 1-7, Published in: EP.
European Patent Office, "Office Action", "from Foreign Counterpart of U.S. Appl. No. 13/080,833", Apr. 18, 2013, pp. 1-4, Published in: EP.

* cited by examiner

*Primary Examiner* — Timothy A Brainard
(74) *Attorney, Agent, or Firm* — Fogg & Powers LLC

(57) ABSTRACT

Systems and methods for automatically determining a noise threshold are provided. In one implementation, a system comprises: an antenna configured to gather data about a surrounding environment; a processing unit configured to remove samples representing target data from the gathered data; to estimate the noise floor from the gathered data with the removed target data; and to determine a noise threshold from the estimated noise floor; and a memory device configured to store the estimated noise floor.

19 Claims, 4 Drawing Sheets

SYSTEMS AND METHODS FOR AUTOMATICALLY DETERMINING A NOISE THRESHOLD

BACKGROUND

In a frequency modulation/continuous wave (FM/CW) radar altimeter the noise level can vary as a function of intermediate frequency (IF). The noise level can also vary over time, temperature, and as a result of production variation. As such, the noise level is not a single number but a curve or collection of linear approximations to a curve as a function of the IF. Further, FM/CW radar altimeters continuously transmit and receive reflected transmissions. Therefore, the noise floor is typically defined from measurements containing normal ground reflection data. As such, the noise level should be determined during normal operation without disturbing the normal operation of the altimeter.

SUMMARY

In one embodiment, a system for automatically determining a noise threshold is provided. The system comprises: an antenna configured to gather data about a surrounding environment; a processing unit configured to remove samples representing target data from the gathered data; to estimate the noise floor from the gathered data with the removed target data; and to determine a noise threshold from the estimated noise floor; and a memory device configured to store the estimated noise floor.

BRIEF DESCRIPTION OF DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
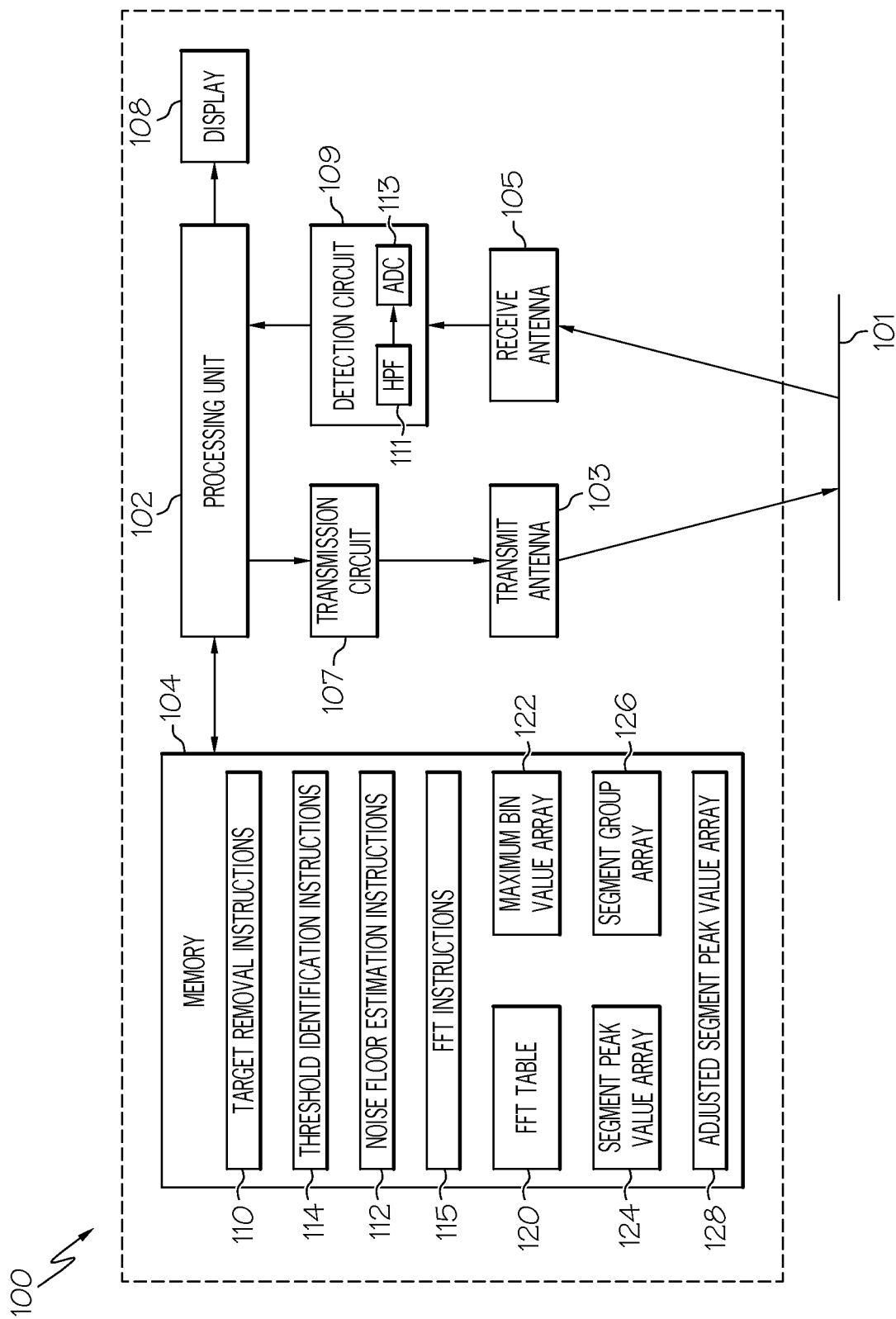
FIG. 1 is a system for automatically determining a noise threshold in a single antenna radar altimeter.

In accordance with common practice, the various described features are not drawn to scale but are drawn to emphasize specific features relevant to the exemplary embodiments.

DETAILED DESCRIPTION

In the following detailed description, references are made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual acts may be performed. The following detailed description is, therefore, not to be taken in a limiting sense.

FIG. 1 is a block diagram of one embodiment of a radar system 100 that automatically determines a noise threshold. In this implementation, the radar system 100 is a FM/CW altimeter. Radar system 100 includes both a transmit antenna 103 and a receive antenna 105. Transmit antenna 103 receives a signal from transmission circuit 107 for transmission towards ground surface 101. The signal is reflected off of the ground surface 101 and picked up by receive antenna 105 and passed to detection circuit 109. In some implementations, radar system 100 is a FM/CW radar altimeter similar to the FM/CW radar altimeter discussed in U.S. Pat. No. 7,239,266, which is herein incorporated by reference. When radar system 100 is an FM/CW radar altimeter, radar system 100 continuously transmits a signal and receives reflections of the signal off of ground. As there is noise mixed in with the received reflections, radar system 100 is configured to estimate a noise floor to correctly identify the reflected signal. As the antenna in radar system 100 is continuously transmitting and receiving when implemented as a FM/CW radar altimeter, system 100 is configured to estimate the noise floor during the normal operation of a FM/CW radar altimeter without stopping transmission of the radar system 100.

In some implementations, after radar system 100 receives a reflected signal on receive antenna 105, radar system 100 passes the signal through a high pass filter 111. High pass filter 111 eliminates variations in the amplitude of the reflected signal due to changes in altitude. However, processing the signal with the high pass filter 111 also causes the noise levels to become non-linear. As the noise floor is not constant, radar system 100 updates the estimation of the noise floor continuously so that the noise floor estimation accurately represents the noise floor of the processed received reflections. When the received signal passes through high pass filter 111, detection circuit passes the signal through an analog to digital converter (ADC) 113. ADC 113 samples the filtered signal received from high pass filter 111 to acquire discrete samples for digital signal processing.

Radar system 100 further includes a processing unit 102 having one or more processors and a memory 104 having one or more memory devices. Processing unit 102 includes at least one electronic device that accepts data and performs mathematical and logical operations. Processing unit 102 includes or functions with software programs, firmware or other computer readable instructions for carrying out various methods, process tasks, calculations, and control functions, used in implementing the functionality described below. These instructions are typically stored on any appropriate computer or machine readable medium used for storage of computer readable instructions or data structures, such as memory 104.

Memory 104 includes at least one device that can hold data in a machine readable medium. The machine readable medium can be implemented as any available media that can be accessed by a general purpose or special purpose computer or processor, or any programmable logic device. Suitable machine or processor-readable media may include storage/memory media such as magnetic or optical media. For example, storage/memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

Memory 104 stores executable instructions for directing the execution of processing unit 102. For example, memory 104 stores FFT instructions 115, target removal instructions 110, noise floor estimation instructions 112, and threshold identification instructions 114. FFT instructions 115 convert the sampled signal received by receive antenna 105 into a frequency domain signal. Processing unit 102 further processes the frequency domain signal to identify the noise threshold by executing target removal instructions 110. Target removal instructions 110 direct processing unit 102 to remove samples representing target data from data received by receive antenna 105. For example, processing unit 102, while executing target removal instructions 110, removes data representing a received reflection by radar system 100 from the data received from radar system 100. Noise floor estimation instructions 112 instruct processing unit 102 to estimate a noise floor from the data that has had the target data removed. Threshold identification instructions 114 direct processing unit 102 to create a noise threshold that allows radar system 100 to identify noise when calculating an altitude or other processing of desired information. In some implementations, when processing unit 102 calculates an altitude based on the noise threshold, processing unit 102 transmits the altitude to a display unit 108 where it can be viewed by a user.

Processing Unit 102 also executes instructions that pre-process the data received from detection circuit 109 for further processing. In some implementations, processing unit 102 pre-processes the received data by splitting the received data into a defined number of samples. For example, processing unit 102 can split the received data into segments of 4096 samples. Processing unit 102 then filters the samples by applying a windowing function. For instance, processing unit 102 may convolute the samples with a Hamming window, a Blackman window, a Hanning window, and the like. Processing unit 102 also executes FFT instructions 115 to perform a fast fourier transform (FFT) or other transform on the windowed samples and converts the FFT results to a decibel scale. After the data has been processed into the decibel scale, the data is available for further processing as an FFT data set.

Figure 2:
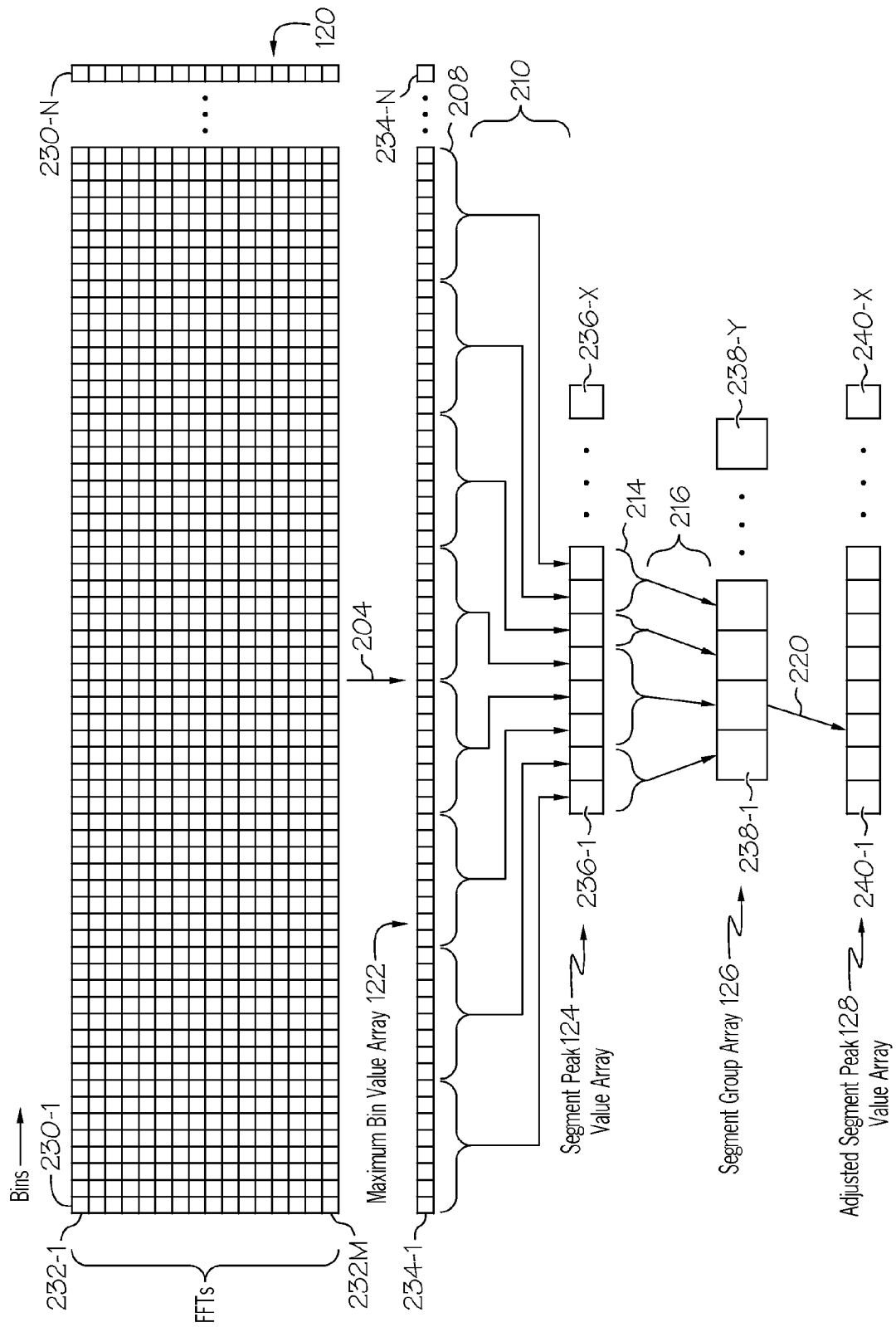
FIG. 2 is a block diagram illustrating the transition of data in the estimation of a noise threshold.

FIG. 2 is a block diagram illustrating the processing of the received data from the antenna when processing unit 102 in FIG. 1 executes the target removal instructions 110. In some implementations, during execution of target removal instructions 110, processing unit 102 stores data in several data structures in memory 104 to facilitate the removal of target data. The phrase "target data," as used herein refers to samples representing the desired signal received by radar system 100. For example, when radar system 100 is a FM/CW radar altimeter, the samples representing the reflected transmission that is received by radar system 100 is the target data. During the removal of target data, processing unit 102 stores data in at least one data structure in memory 104. The data structures include FFT table 120, maximum bin value array 122, segment peak value array 124, segment group array 126, and adjusted segment peak value array 128. In some implementations, before processing any data received from radar system 100, processing unit 102 initializes the data structures in memory 104 such that the data structures are in a known state (for example, all the entries in the data structure are set to "0").

When processing unit 102, executing target removal instructions 110, receives data from radar system 100 that has been processed into an FFT data set 232-1 . . . 232-M, processing unit 102 stores the received FFT data set 232-1 . . . 232-M in FFT table 120. In some implementations, FFT table 120 is a two dimensional array that stores a predetermined amount of FFT data sets 232-1 . . . 232-M. For example, where the original data received by radar system 100 was divided into sets of 4096 samples, as processing unit 102 performs the FFT on the 4096 samples and converts the samples into FFT data sets 232-1 . . . 232-M, each FFT data set 232-1 . . . 232-M contains 2048 bins 230-1 . . . 230-N, where the bins 230-1 . . . 230-N have a one to one correspondence to a spectral line. As shown in FIG. 2, FFT table 120 stores the bins 230-1 . . . 230-N of an FFT data set 232-1 . . . 232-M in FFT table 120. As processing unit 102 processes successive FFT data sets 232-1 . . . 232-M, processing unit 102 will store the newly received FFT data sets 232-1 . . . 232-M in FFT table 120 without overwriting the previously stored FFT data sets 232-1 . . . 232-M. Processing unit 102 continues to store FFT data sets 232-1 . . . 232-M in FFT table 120 until FFT table 120 is filled and/or ready for further processing. For example, FFT table 120 stores 20 FFT data sets 232-1 . . . 232-20 before the data is processed to estimate the noise floor. Thus, processing unit 102 receives 20 FFT data sets 232-1 . . . 232-20 and stores the 20 FFT data sets 232-1 . . . 232-20 having 2048 bins in FFT table 120.

Target removal instructions 110 direct processing unit 102 to perform a data set comparison 204 on the data in FFT table 120 and store the results in maximum bin value array 122. Maximum bin value array 122 is a one dimensional array configured to hold the identified maximum bin value for each bin location 230-1 . . . 230-N in FFT table 120. Data set comparison 204 compares the corresponding bins from each FFT data set 232-1 . . . 232-M in FFT table 120 to identify the maximum bin value for each corresponding bin 230-1 . . . 230-N in the FFT data sets 232-1 . . . 232-M stored in FFT table 120 in memory 104. For example, data set comparison 204 compares the first bin 230-1 from each FFT data set 232-1 . . . 232-M in FFT table 120. Data set comparison 204 then identifies the maximum value stored in the first bin 230-1 of each FFT data set 232-1 . . . 232-M and stores the identified maximum bin value for the first bin 230-1 and stores it in the first bin location 234-1 of maximum bin value array 122. Data set comparison 204 then identifies the maximum bin value for the bins 230-1 . . . 230-N in FFT table 120 and stores the identified maximum bin value in the corresponding bins 234-1 . . . 234-N in maximum bin value array 122.

Target removal instructions 110 instruct processing unit 102 to perform a segmenting 208, where segmenting divides maximum bin value array 122 into equal segments. The term "segment", as used herein, refers to contiguous sections of bins of a predetermined size. For example, maximum bin value array 122 contains 2048 bins 234-1 . . . 234-N. Segmenting 208 divides the 2048 bins into 128 segments that each contain 16 bins. Target removal instructions 110 then direct processing unit 102 to perform segment comparison 210. When processing unit 102 performs segment comparison 210, processing unit 102 identifies the maximum bin value within each segment. For example, processing unit 102 compares the bins within a segment and identifies the maximum segment bin value. The phrase "maximum segment bin value," as used herein, refers to the maximum bin value within a segment. For example, in a segment having sixteen bins, processing unit 102 identifies the bin with a magnitude that is greater than the other bins. When processing unit 102 identifies the maximum segment bin value for a segment, processing unit 102 stores the identified maximum segment bin value in a corresponding location 236-1 . . . 236-X in segment peak value array 124. For example, if the maximum segment bin value represented the third segment from the beginning of the array, processing unit 102 would store the maximum segment bin value in the third location 236-1 . . . 236-X in segment peak value array 124 in memory 104.

Further, target removal instructions 110 direct processing unit 102 to perform a segment grouping 214, where segment grouping divides the locations 236-1 . . . 236-X of segment peak value array 124 into segment groups. The phrase "segment group," as used herein, refers to a set of segments that have been grouped together because of a common characteristic. For example, segments can be grouped together based on their linearity or other common characteristic. As such, one segment group may contain more segments than another segment group. Further, a segment group can represent anywhere from one segment to all the segments. In some implementations, segment peak value array 124 contains 128 segments 236-1 . . . 236-X and as processing unit 102 performs segment grouping 214, processing unit 102 divides the 128 segments 236-1 . . . 236-X into groups according to the linearity exhibited by the segments.

Target removal instruction 110 then directs processing unit 102 to perform segment group averaging 216. When processing unit 102 performs segment group averaging 216, processing unit 102 computes a segment group average for each segment group. The phrase "segment group average," as used herein, refers to an average of the maximum segment bin values within a segment group. Processing unit 102 stores the segment group average for each segment group 238-1 . . . 238-Y in segment group array 126 in memory 104.

Target removal instructions 110 instruct processing unit 102 to perform segment peak adjustment 220. When processing unit 102 performs segment peak adjustment 220, processing unit 102 removes the peak values that represent the target data. To remove the peak values that represent the target data, processing unit 102 calculates a partial segment group average for each segment group 238-1 . . . 238-Y. The phrase "partial segment group average," as used herein, refers to an average of all the maximum segment bin values that have a value that is less than the value of the segment group average. For example, for each segment group 238-1 . . . 238-Y, processing unit 102 determines which maximum segment bin values are less than the segment group average. During normal operation, the values that represent the target data have a greater magnitude than the signal portions representing the noise floor. Because of their comparatively large magnitude, the target data is typically greater than the segment group average while the noise floor is typically less than the segment group average. By removing the segment peak values that are larger than the segment group average and calculating a partial segment group average based only on the segment peak values that are less than the segment group average, the partial segment group average typically is the average of the segment peak values that represent noise.

When the partial segment group average is calculated, processing unit 102, executing target removal instructions 110, stores data in the adjusted segment peak value array 222. Adjusted segment peak value array 128 is similar to segment peak value array 124 except that it has had the maximum segment bin values that represent target data adjusted to represent the noise floor. For example, the index locations 236-1 . . . 236-X in segment peak value array 124 represent the same index locations 240-1 . . . 240-X in adjusted segment peak value array 128. To adjust the target data to instead represent the noise floor, processing unit 102 determines whether or not the maximum segment bin value is greater than the corresponding segment group average. If the maximum segment bin value is less than its segment group average, then the maximum segment bin value is stored in the same index location 240-1 . . . 240-X in the adjusted segment peak value array 128. If the maximum segment bin value is greater than the segment group average, then the partial segment group average is stored in the same index location 240-1 . . . 240-X in the adjusted segment peak value array 128.

In some implementations, target removal instructions 110 instruct processing unit 102 to calculate the maximum segment bin value differently for the first and last segments in the adjusted segment peak value array 128. For instance, when radar system 108 is a FM/CW radar altimeter, the segments in the last segment group 238-Y represent altitudes beyond a maximum altitude that is represented by the FM/CW radar altimeter. As the segments in the last segment group represent altitudes beyond the maximum range of the FM/CW radar altimeter, the segments in the last segment 238-Y group are set to the partial segment group average for the penultimate segment group 238-(Y−1) when the maximum segment bin values are stored in the same index location 240-1 . . . 240-X in the adjusted segment peak value array 128. Also, when radar system 100 is a FM/CW radar altimeter the first segment group 240-1 may include transceiver to receiver leakage which can be compensated for by adding an additional threshold to the first segment group 240-1.

When processing unit 102 stores adjusted segment peak value array 128 in memory 104, noise floor estimation instructions 112 instruct processing unit 102 to compute a continuous noise floor estimation function. To calculate the continuous noise floor estimation function, processing unit 102 computes connecting equations from the adjusted segment peak value for each segment. For example, processing unit 102 calculates the continuous noise floor estimation function using point slope connections between the adjusted segment peak values for each segment. Processing unit 102 forms the point slope connections by deriving different linear equations that connect each adjusted segment peak value with the adjusted segment peak values of the proximate segments.

Figure 3:
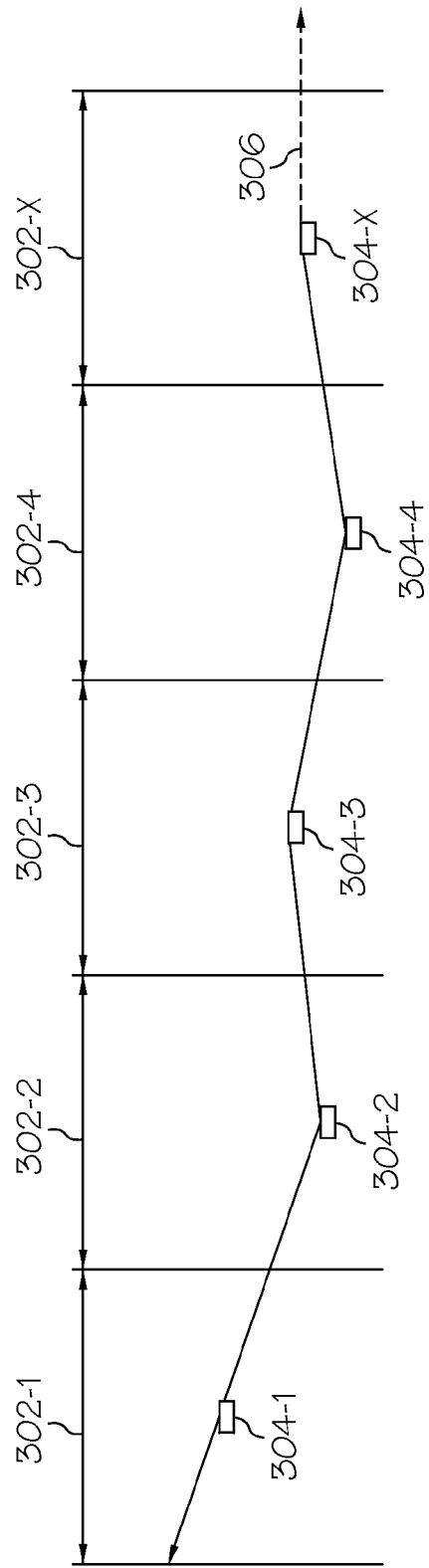
FIG. 3 is a graph illustrating a noise floor estimation function.

FIG. 3 shows a graph 300 illustrating one embodiment of the continuous noise floor estimation function 306. Graph 300 includes segments 302-1, 302-2, . . . , 302-X and their corresponding adjusted segment peak values 304-1, 304-2, . . . , 304-X. As described earlier, processing unit 102, executing noise floor estimation instructions 112, identifies a linear equation between each adjusted segment peak value 304-1, 304-2, . . . , 304-X. For example, segment 302-1 has a corresponding adjusted segment peak value 304-1; segment 302-2 has a corresponding adjusted segment peak value 304-2. Processing unit 102 calculates continuous noise floor estimation function 306 between segments 302-1 and 302-2 by calculating the slope between the adjusted segment peak values 304-1 and 304-2 and adjusting the line such that it connects adjusted segment peak value 304-1 to adjusted segment peak value 304-2. The calculation of the line connecting the adjusted segment peak values is repeated for each adjusted segment peak value. Processing unit 102 stores information describing the continuous noise floor estimation function 306 in memory 104.

When a continuous noise floor estimation function is stored in memory 104, threshold identification instructions 114 direct processing unit 102 to calculate a noise floor threshold. Processing unit 102 calculates the noise floor threshold by computing a noise threshold equation. The noise threshold equation is similar to the continuous noise floor estimation function with the exception that the noise threshold equation is set to be a predetermined decibel level higher than the continuous noise floor estimation function. Processing unit 102 stores the noise threshold function in memory 104.

Figure 4:
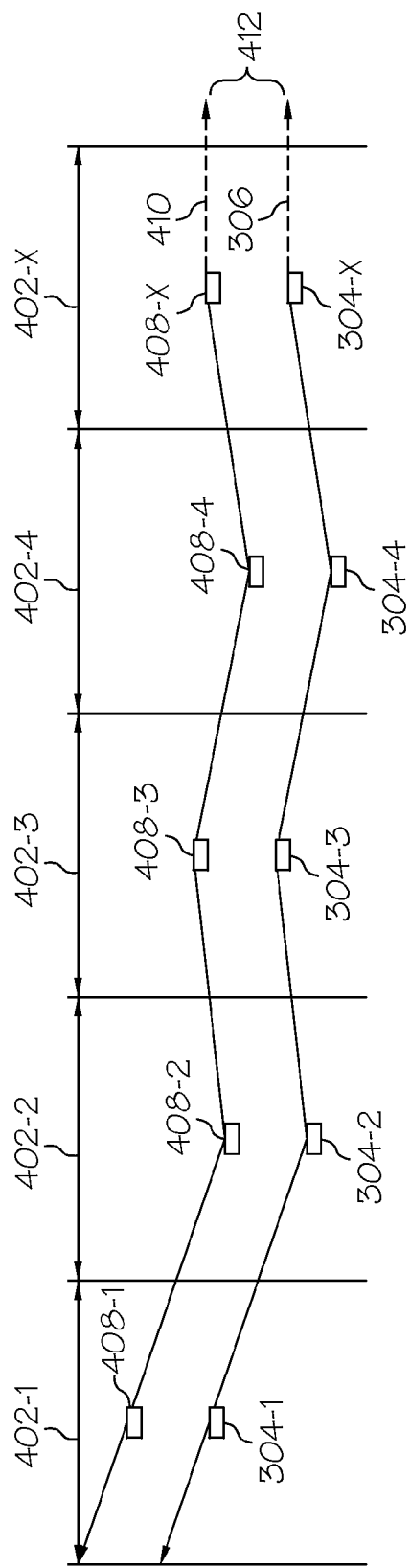
FIG. 4 is a graph illustrating a noise threshold function.

FIG. 4 shows a graph 400 illustrating both a continuous noise floor estimation function 306 and a noise threshold equation 410. The continuous noise floor estimation function 306 is substantially similar to the continuous noise floor estimation function 306 in FIG. 3. Each segment has adjusted segment peak values 304-1 . . . 304-X associated with a segment 402-1 . . . 402-X which is similar to segments 302-1 . . . 302-X in FIG. 3 where each segment 302-1 . . . 302-X has an accompanying adjusted segment peak value 304-1 . . . 304-X. To calculate noise threshold equation 410, processing unit 102 increases the magnitude of each adjusted segment peak value 304-1 . . . 304-X by predetermined decibels 412 to form a set of segment noise threshold values 408-1 . . . 408-X. For example, the magnitude of an adjusted segment peak value 304-1 is increased by predetermined decibels 412 to form segment noise threshold value 408-1. In some embodiments, the predetermined decibels 412 is between 7 and 10 decibels. When processing unit 102, executing threshold identification instructions 114, identifies the segment noise threshold values 408-1 . . . 408-X, processing unit 102 uses the calculated segment noise threshold values 408-1 . . . 408-X to calculate noise threshold equation 410. Processing unit 102 calculates noise threshold equation 410 from segment noise threshold values 408-1 . . . 408-X in the same manner that processing unit 102 calculates continuous noise estimation function 306 from adjusted segment peak values 304-1 . . . 304-X as explained in connection with FIG. 3. Noise threshold equation 410 is parallel to noise floor estimation function 306 and offset above noise floor estimation function 306 by predetermined decibels 412.

When a noise threshold equation is calculated and stored in memory 104, processing unit 102 can use the noise threshold equation to reject signals received on radar system 100 that fall below the noise threshold equation. Processing unit 102 then can use the target data left in the signal to calculate the desired information. For example, when the radar system 100 is part of a FM/CW radar altimeter, the target data can be used to calculate altitude. The calculation of altitude with a noise threshold is further discussed in U.S. Pat. No. 7,825,851, which is herein incorporated by reference.

In some implementations, radar system 100 receives samples continuously and the noise floor changes with the reception of samples. As the noise floor changes non-linearly, processing unit 102 recalculates the noise threshold equation as new samples are received. As new data is received in the form of FFT data sets, processing unit 102 waits, in some embodiments, until a predetermined number of FFT data sets are received before recalculating the noise threshold equation. For example, processing unit 102 will recalculate the noise threshold equation after receiving four new FFT data sets. Alternatively, processing unit 102 can recalculate the noise threshold equation after receiving between one FFT data set and the number of FFT data sets that can be stored in FFT table 120.

When processing unit 102 recalculates the noise threshold equation, processing unit 102 shifts the number of FFT data sets out of FFT table 120 that correspond with the number of newly received FFT data sets that will be shifted into FFT table 120. To most accurately represent the data that was received, processing unit 102 shifts the FFT data sets out of FFT table 120 that were received first from radar system 100. When the oldest FFT data sets are shifted out of FFT table 120, the remaining FFT data sets are shifted over to free space for the newly received data sets which are then added to FFT table 120. When the new FFT data sets are stored in FFT table 120, processing unit 102 recalculates the noise threshold, using the calculation process described above in relation to the original FFT data sets. Processing unit 102 recalculates the noise threshold equation so that the noise threshold equation is defined from the same FFT data sets that are used to obtain the desired data. For example, the noise threshold equation is recalculated such that the noise threshold equation was derived from the same set of FFT data sets as an altitude computed from a set of FFT data sets in an FM/CW radar altimeter.

Figure 5:
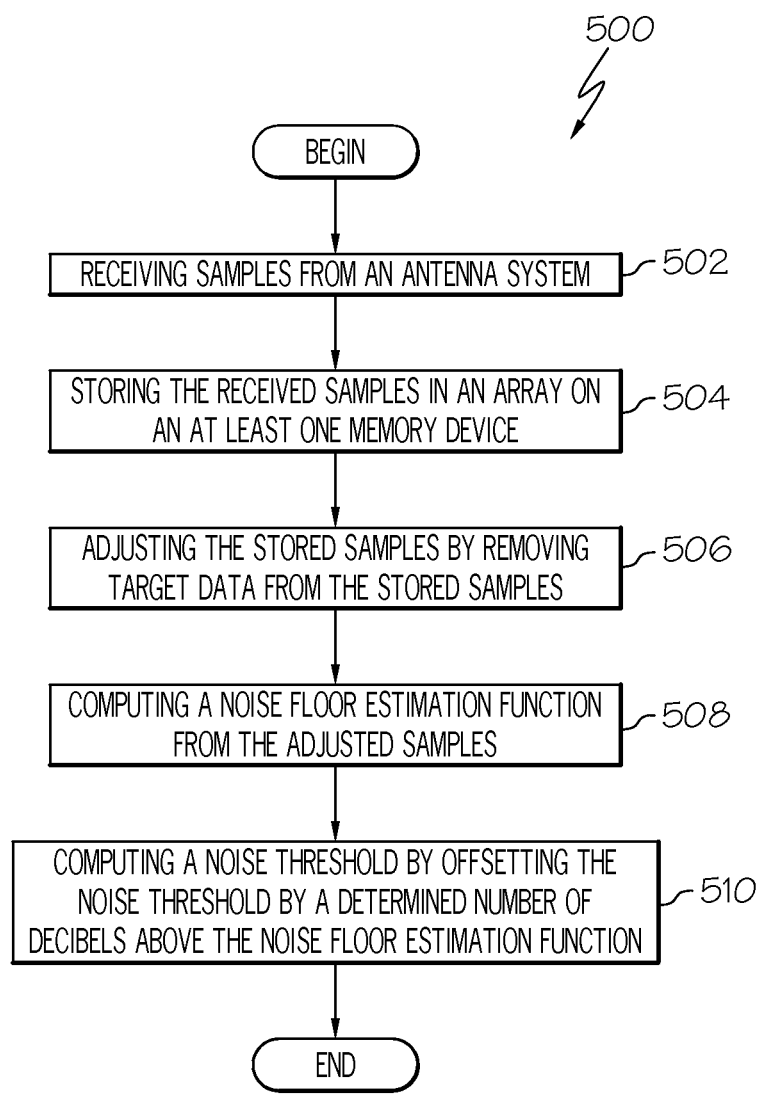
FIG. 5 is a flow diagram illustrating an exemplary method for determining a noise threshold.

FIG. 5 is a flow diagram of a method 500 for automatically determining a noise threshold. A system performing method 500 performs substantially similar to system 100 in FIG. 1. At block 502, samples are received from an antenna system. For example, a FM/CW radar altimeter receives ground reflections and transmits samples of the received data to a processing unit for further processing. At block 504, received samples are stored in an array on an at least one memory device. For example, when an antenna system receives and samples data. A processing unit receives the samples from the antenna and stores the received samples in an array on a memory device. At block 506, the stored samples are adjusted by removing target data from the stored samples. For example, where the source of the samples is a single antenna radar altimeter, the stored samples contain both noise and target data representing a sensed target. To determine the noise floor, the processing unit removes the target data from the samples to form adjusted samples representing the noise alone as discussed above. The processing unit then saves the adjusted samples in memory.

At block 508, a noise floor estimation function is computed from the adjusted samples. For example, the adjusted samples contain data representing noise. To identify a noise floor, the data can be split into segments and the peak noise value of the segments can be used as an estimation of the noise floor. The processing unit then calculates a noise floor estimation function from the peak noise values of each segment, which, in some implementations, consists of a point slope line connecting the peak noise values. At block 510, a noise threshold is created by offsetting the noise threshold by a determined number of decibels above the noise floor estimation function. For example, the processing unit calculates the noise threshold by offsetting the noise floor estimation function by a determined number of decibels.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed:

1. A system for automatically determining a noise threshold, the system comprising:
an antenna configured to gather data about a surrounding environment;
a processing unit configured to remove samples representing target data from the gathered data in the frequency domain; to estimate the noise floor from the gathered data with the removed target data; and to determine a noise threshold from the estimated noise floor, wherein the gathered data from the antenna is processed to be represented by a plurality of fast Fourier transforms, wherein each fast Fourier transform in the plurality of fast Fourier transforms is performed by the processing unit at a different time; and
a memory device configured to store the estimated noise floor.

2. The system of claim 1, wherein the gathered data is represented by a plurality of data sets, wherein each data set in the plurality of data sets has the same number of points, a location of the points in one data set corresponding to a location of the points in another data set.

3. The system of claim 2, wherein the processing unit is configured to remove samples representing target data by:
creating a maximum point value array, the maximum point value array containing a maximum point value for each set of corresponding points from the plurality of data sets;
dividing the maximum point value array into segments, each segment having the same number of points;
storing the maximum point value of each segment in a segment peak value array in the memory device;
storing the average segment peak value for a segment group in a segment group array, the segment group containing data from a plurality of segments;
when the maximum point value in a segment is greater than a corresponding average segment peak value, adjusting the maximum point value to the corresponding average segment peak value; and
storing the adjusted maximum bin value in an adjusted segment peak value array.

4. The system of claim 1, wherein the processing unit is configured to create a continuous noise floor estimation function from an adjusted segment peak value array, the adjusted segment peak value array representing the peak values of the array with the target data removed.

5. The system of claim 4, wherein the processing unit is configured to create a threshold that is offset from the continuous noise floor estimation by a predetermined number of decibels.

6. The system of claim 1, wherein the antenna is part of a single antenna radar altimeter.

7. The system of claim 1, wherein the processing unit is configured to detect a target altitude based on the noise threshold.

8. The system of claim 1, wherein the processing unit is configured to update a noise floor estimation as data is received from the antenna.

9. A method for automatically determining a noise threshold, the method comprising:
receiving samples from an antenna system, wherein the samples are represented by a plurality of fast Fourier transforms, each fast Fourier transform in the plurality of fast Fourier Transforms being performed at a different time;
storing the received samples in an array on an at least one memory device;
adjusting the stored samples by removing target data from the stored samples in the frequency domain;
computing a noise floor estimation function from the adjusted samples; and
computing a noise threshold by offsetting the noise threshold by a determined number of decibels above the noise floor estimation function.

10. The method of claim 9, wherein each fast Fourier transform in the plurality of fast Fourier transforms has the same number of bins, the bins in one fast Fourier transform corresponding to the bins in each fast Fourier transform in the plurality of fast Fourier transforms.

11. The method of claim 10, wherein adjusting the stored samples by removing target data from the stored samples comprises:
storing a peak value for a bin from the plurality of fast Fourier transforms in the at least one memory device;
determining a peak value for a segment of bins;
determining an averaged peak value for a group of segments;
determining a partial averaged peak value for the group of segments; and
determining an adjusted peak value for the group of segments.

12. The method of claim 9, further comprising updating the noise threshold as further samples are received from the antenna.

13. The method of claim 9, further comprising using the noise threshold to detect an altitude.

14. The method of claim 9, wherein the antenna system is part of a single antenna radar altimeter.

15. A program product comprising a non-transitory processor-readable medium on which program instructions are embodied, wherein the program instructions are configured, when executed by at least one programmable processor, to cause the at least one programmable processor to:
initialize variables and arrays on at least one memory device;
store samples received from an antenna in an array on the at least one memory device, wherein the samples are stored as a plurality of fast Fourier transforms, each fast Fourier Transform in the plurality of fast Fourier transform being performed at a different time;
adjust the stored samples by removing target data from the stored samples in the frequency domain;
compute a noise floor estimation function from the adjusted samples; and
create a noise threshold by offsetting the noise threshold by a determined number of decibels above the noise floor estimation function.

16. The program product of claim 15, wherein each fast Fourier transform in the plurality of fast Fourier transforms has the same number of bins, the bins in one fast Fourier transform corresponding to the bins in each fast Fourier transform in the plurality of fast Fourier transforms.

17. The program product of claim 16, wherein the program instructions are further configured to cause at least one programmable processor to:
store a peak value for a bin from the plurality of fast Fourier transforms in the at least one memory device;
determine a peak value for a segment of bins;
determine an averaged peak value for a group of segments;
determine a partial averaged peak value for the group of segments; and
determine an adjusted peak value for the group of segments.

18. The program product of claim 15, wherein the program instructions are further configured to cause at least one programmable processor to update the noise threshold as further samples are received from the antenna.

19. The program product of claim 15, wherein the program instructions are further configured to cause at least one programmable processor to detect an altitude based on the noise threshold.

* * * * *